United States Patent
Ghosh et al.

(10) Patent No.: US 12,549,603 B2
(45) Date of Patent: Feb. 10, 2026

(54) DYNAMIC DATA SECURITY REQUIREMENTS IN A NETWORK

(71) Applicant: INTERNATIONAL BUSINESS MACHINES CORPORATION, Armonk, NY (US)

(72) Inventors: Partho Ghosh, Kolkata (IN); Sarbajit K. Rakshit, Kolkata (IN); Venkata Vara Prasad Karri, Visakhapatnam (IN); Akash U. Dhoot, Pune (IN)

(73) Assignee: International Business Machines Corporation, Armonk, NY (US)

(*) Notice: Subject to any disclaimer, the term of this patent is extended or adjusted under 35 U.S.C. 154(b) by 636 days.

(21) Appl. No.: 17/932,049

(22) Filed: Sep. 14, 2022

(65) Prior Publication Data

US 2024/0089292 A1    Mar. 14, 2024

(51) Int. Cl.
*H04L 29/06* (2006.01)
*G06F 21/60* (2013.01)
*G06F 21/62* (2013.01)
*H04L 9/40* (2022.01)

(52) U.S. Cl.
CPC .......... *H04L 63/20* (2013.01); *G06F 21/602* (2013.01); *G06F 21/6218* (2013.01); *H04L 63/0428* (2013.01); *H04L 63/105* (2013.01)

(58) Field of Classification Search
CPC ..... H04L 63/20; H04L 63/10; H04L 63/0428; H04L 63/105; G06F 21/6218; G06F 21/602
See application file for complete search history.

(56) References Cited

U.S. PATENT DOCUMENTS

| | | | |
|---|---|---|---|
| 10,713,376 B2 | 7/2020 | Timmerman | |
| 2004/0190715 A1* | 9/2004 | Nimura | H04L 9/0872 380/44 |
| 2005/0180574 A1* | 8/2005 | Ritz | H04L 9/0838 380/277 |
| 2020/0053049 A1* | 2/2020 | Kurian | H04L 63/0209 |
| 2020/0387518 A1 | 12/2020 | Kesarwani | |
| 2021/0224276 A1* | 7/2021 | Schneider | G06F 16/24542 |

* cited by examiner

*Primary Examiner* — Longbit Chai
(74) *Attorney, Agent, or Firm* — David K. Mattheis

(57) ABSTRACT

Systems, methods and/or computer program products for dynamically adjusting levels of data security, encryption enforcement, confidentiality, network policies and other parameters within a network and at processing nodes thereof, implementing heightened levels of security and encryption as needed, based on the type of datasets being processed. Enforcement and removal of data security, encryption requirements, confidentiality, network policies and other parameters at the nodes of the network is performed using headers and footers added to the source dataset. Headers prescribe the heightened level of security or encryption being enforced at each node of the network along the source dataset's flow trajectory, while footers follow the completed processing of the source dataset and indicates to the nodes along the data flow trajectory the conditions for removing the heightened level of security, encryption, confidentiality, network policies and other parameters prescribed by the headers.

20 Claims, 6 Drawing Sheets

DYNAMIC DATA SECURITY REQUIREMENTS IN A NETWORK

BACKGROUND

The present disclosure relates generally to the field of data security, and more specifically, defining data security requirements of source datasets throughout the entire data flow trajectory of a network and within different processing nodes of the network.

Data security is the practice of protecting digital information from unauthorized access, corruption, or theft throughout its entire lifecycle. It's a concept that encompasses every aspect of information security from the physical security of hardware and storage devices to administrative and access controls, as well as the logical security of software applications. Data security also includes organizational policies and procedures. Data security tools and technologies address the growing challenges inherent in securing today's complex, distributed, hybrid, and/or multi-cloud computing environments. These include understanding where data resides, keeping track of who has access to it, and blocking high-risk activities and potentially dangerous file movements. Comprehensive data protection solutions that enable enterprises to adopt a centralized approach to monitoring and policy enforcement can simplify the task. When properly implemented, robust data security strategies will protect an organization's information assets against cybercriminal activities, but they also guard against insider threats and human error, which remains among the leading causes of data breaches today.

Data security involves deploying tools and technologies that enhance the organization's visibility into where its critical data resides and how it is used. Ideally, these tools should be able to apply protections like encryption, data masking, and redaction of sensitive files, and should automate reporting to streamline audits and adhering to regulatory requirements. Encryption uses an algorithm to transform normal text characters into an unreadable format, encryption keys scramble data so that only authorized users can read it. File and database encryption solutions serve as a line of defense for sensitive volumes by obscuring their contents through encryption or tokenization. Data masking masks personally identifiable information (PII) where necessary so that development can occur in environments that are compliant and allow for teams to develop applications or train people using real data without being able to identify who data belongs to.

SUMMARY

Embodiments of the present disclosure relate to a computer-implemented method, an associated computer system and computer program products dynamically defining and enforcing data security and encryption requirements of a source dataset throughout a data flow trajectory of a network. The computer-implemented method comprises: selecting, by a processor of the network, a data file generated by a source data system of the network, the data file comprising a header, the source dataset, and a footer, wherein the header specifies a level of security or encryption for the processing nodes and network nodes along the data flow trajectory of the network responsible for processing the source dataset, and the footer specifies at least one condition for removing the level of security or encryption prescribed by the header from the network nodes and processing nodes; transmitting, by the processor, the header of the source dataset through the data flow trajectory of the network to be read by the processing nodes and network nodes; configuring, by the processor, each of the processing nodes and network nodes along the data flow trajectory with enforcement of data security and encryption at the level of security or encryption specified by the header, consistent with network rules for processing a type of data within the source dataset; routing, by the processor, the source dataset through the processing nodes and the network nodes of the data flow trajectory for processing; upon completion of the processing of the source dataset, transmitting, by the processor, the footer to the processing nodes and network nodes along the data flow trajectory; and removing, by the processor the level of security or encryption being enforced by the processing nodes and the network nodes, as specified by the footer.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

DETAILED DESCRIPTION

Figure 1:
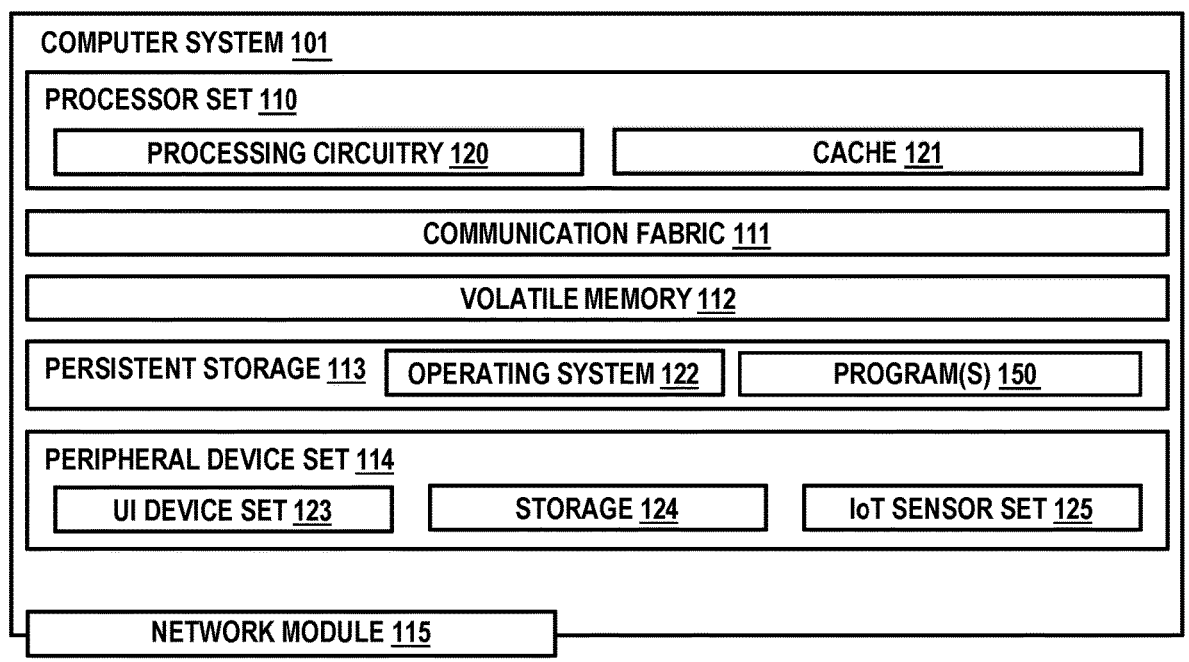
FIG. 1 depicts a block diagram illustrating an embodiment of a computer system and the internal and external components thereof, upon which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

Overview

Different types of data flowing through a network may have different levels of confidentiality and/or sensitivity required for transmission across the network and/or to process the data at various processing nodes of the network. Providing heightened levels of data security across the network can be expensive and can incur additional costs in order to ensure data is protected at the necessary security levels. Not every dataset being processed by the network, however, may require a heightened level of security. Data confidentiality requirements, security policies, encryption requirements and other security parameters can differ amongst different types of datasets. Maintaining a heightened level of security for all datasets, including those datasets being processed that do not need a heightened level of security, can burdensome and expensive. Therefore, there is a need for a system, methods and/or program products capable of dynamically adjusting the enforcement level of a network's security, confidentiality, encryption and/other enforcement parameters based on the type of datasets that are being transmitted and/or processed by a network. Such systems, methods, and/or program products described herein allow the nodes of the network to dynamically adjust security requirements by increasing the level of security as necessary to ensure adequate protection of certain data types and reduce security when such levels of strong security or heightened confidentiality are not required.

Embodiments of the present disclosure recognize the need for dynamically adjusting data security and encryption enforcement within a network, at both the processing nodes and at various nodes of the network in order to implement heightened levels of security and encryption as needed. Embodiments adjust the data security and encryption enforcements based on the type of datasets being processed and removing or reducing heightened security and encryption requirements while transmitting or processing datasets that do not require the heightened levels of security or encryption. Embodiments of the present disclosure may dynamically implement and remove the enforcement of data security and/or encryption requirements of different types of datasets using headers and footers to install and remove the enforcement requirements. Embodiments of the present disclosure may install header and/or footer generating software onto a data source system. As the data source system generates a source dataset, a header specifying the level of security and encryption required within the different processing nodes and nodes of the network intending to receive the source dataset during processing can be inserted into the data file comprising the source dataset.

Embodiments of the source data system may be capable of inserting a footer into a data file following the source dataset. A footer may specify conditions upon which any additional security or encryption required to process the source dataset can be removed from the network nodes and/or processing nodes, following the processing of the source dataset. Since embodiments of the source dataset may have different levels of required security and/or encryption for different portions of the dataset being processed, in some embodiments the source data system may insert a plurality of different footers within different portions of the source dataset. Each footer may specify removal of different security requirements or encryption requirements as the different portions of the source dataset are processed.

During the processing of the source dataset, embodiments of the proposed system described herein may initially read the header of the generated source dataset that will be flowing through the entire data flow trajectory of the network during processing. The nodes of the entire data flow trajectory reading the header can include one or more portions of the network (i.e., network nodes) and/or processing nodes. Each node of the network may read the header associated with the source dataset and configure enforcement of the security and encryption requirements prescribed by the header for each of the nodes along the data flow trajectory responsible for processing the source dataset. Once the header is read and enforcement of the data security and/or encryption is configured at each network node and/or processing node, the actual source dataset may be transmitted through the network for processing in a manner consistent with the data security and/or encryption requirements required by the header associated with the source dataset.

Following processing of the source dataset, embodiments of the present disclosure may transmit the footer associated with the dataset through the network along the data flow trajectory processing the source dataset. The footer may specify conditions upon which the level of data security and/or encryption prescribed by the header of the source dataset may be removed by the nodes of the network. As each of the network nodes and processing nodes along the data flow trajectory of the source dataset receive the footer of source dataset, the nodes of the network may read the footer and analyze whether or not conditions prescribed by the footer are met. Upon meeting the conditions for removal of the level of data security and/or encryption requirements prescribed by the header of the source dataset, the nodes of the network may proceed with removing or revoking the required level of security and/or encryption from the processing nodes and network nodes of the network.

Computing System

Various aspects of the present disclosure are described by narrative text, flowcharts, block diagrams of computer systems and/or block diagrams of the machine logic included in computer program product (CPP) embodiments. With respect to any flowcharts (depending upon the technology involved) the operations can be performed in a different order than what is shown in the flowchart. For example, two operations shown in successive flowchart blocks may be performed in reverse order, as a single integrated step, concurrently, or in a manner at least partially overlapping in time. A computer program product embodiment ("CPP embodiment") is a term used in the present disclosure that may describe any set of one or more storage media (or "mediums") collectively included in a set of one or more storage devices. The storage media may collectively include machine readable code corresponding to instructions and/or data for performing computer operations.

A "storage device" may refer to any tangible hardware or device that can retain and store instructions for use by a computer processor. Without limitation, the computer readable storage medium may include an electronic storage medium, a magnetic storage medium, an optical storage medium, an electromagnetic storage medium, a semiconductor storage medium, a mechanical storage medium, and/or any combination thereof. Some known types of storage devices that include mediums referenced herein may include a diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination thereof. A computer-readable storage medium should not be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As understood by those skilled in the art, data is typically moved at some occasional points in time during normal operations of a storage device, such as during access, de-fragmentation or garbage collection, but this does not render the storage device as transitory because the data is not transitory while it is stored.

FIG. 1 illustrates a block diagram describing an embodiment of a computing system 101 within in a computing environment, which may be a simplified example of a computing device (i.e., a physical bare metal system and/or a virtual system) capable of performing the computing operations described herein. Computing system 101 may be representative of the one or more computing systems or devices implemented in accordance with the embodiments of the present disclosure and further described below in detail. It should be appreciated that FIG. 1 provides only an illustration of one implementation of a computing system 101 and does not imply any limitations regarding the environments in which different embodiments may be implemented. In general, the components illustrated in FIG. 1 may be representative of an electronic device, either physical or virtualized, capable of executing machine-readable program instructions.

Embodiments of computer system 101 may take the form of a desktop computer, laptop computer, tablet computer, smart phone, smart watch or other wearable computer, mainframe computer, quantum computer or any other form of computer or mobile device now known or to be developed in the future that is capable of running one or more program 150, accessing a network or querying a database, such as remote database 130. Performance of a computer-implemented method executed by a computer system 101 may be distributed among multiple computers and/or between multiple locations. Computer system 101 may be located as part of a cloud network, even though it is not shown within a cloud in FIGS. 1-2. Moreover, computer system 101 is not required to be in a cloud network except to any extent as may be affirmatively indicated.

Processor set 110 includes one, or more, computer processors of any type now known or to be developed in the future. Processing circuitry 120 may be distributed over multiple packages. For example, multiple, coordinated integrated circuit chips. Processing circuitry 120 may implement multiple processor threads and/or multiple processor cores. Cache 121 may refer to memory that is located on the processor chip package(s) and/or may be used for data or code that can be made available for rapid access by the threads or cores running as part of processor set 110. Cache 121 can be organized into multiple memory levels depending upon relative proximity to the processing circuitry 120. Alternatively, some, or all of cache 121 of processor set 110 may be located "off chip." In some computing environments, processor set 110 may be designed for working with qubits and performing quantum computing.

Computer readable program instructions can be loaded onto computer system 101 to cause a series of operational steps to be performed by processor set 110 of computer system 101 and thereby effect a computer-implemented method. Execution of the instructions can instantiate the methods specified in flowcharts and/or narrative descriptions of computer-implemented methods included in this specification (collectively referred to as "the inventive methods"). The computer readable program instructions can be stored in various types of computer readable storage media, such as cache 121 and the other storage media discussed herein. The program instructions, and associated data, can be accessed by processor set 110 to control and direct performance of the inventive methods. In computing environments of FIGS. 1-2, at least some of the instructions for performing the inventive methods may be stored in persistent storage 113, volatile memory 112, and/or cache 121, as program(s) 150, application(s), processes, services, and installed components thereof. For example, program instructions, processes, services and installed components thereof may include header and footer module 303 and security and encryption module 307, as shown in FIGS. 3A-3B.

Communication fabric 111 may refer to signal conduction paths that may allow the various components of computer system 101 to communicate with each other. For example, communications fabric 111 can provide for electronic communication among the processor set 110, volatile memory 112, persistent storage 113, peripheral device set 114 and/or network module 115. Communication fabric 111 can be made of switches and/or electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 may refer to any type of volatile memory now known or to be developed in the future, and may be characterized by random access, but this is not required unless affirmatively indicated. Examples include dynamic type random access memory (RAM) or static type RAM. In computer system 101, the volatile memory 112 is located in a single package and can be internal to computer system 101, but, alternatively or additionally, the volatile memory 112 may be distributed over multiple packages and/or located externally with respect to computer system 101. Program(s) 150, application(s), processes, services, and installed components thereof, described herein, may be stored in volatile memory 112 and/or persistent storage 113 for execution and/or access by one or more of the respective processor sets 110 of the computing system 101.

Persistent storage 113 can be any form of non-volatile storage for computers that may be currently known or developed in the future. The non-volatility of this storage means that the stored data may be maintained regardless of whether power is being supplied to computer system 101 and/or directly to persistent storage 113. Persistent storage 113 may be a read only memory (ROM), however, at least a portion of the persistent storage 113 may allow writing of data, deletion of data and/or re-writing of data. Some forms of persistent storage 113 may include magnetic disks, solid-state storage devices, hard drives, flash-based memory, erasable read-only memories (EPROM) and semi-conductor storage devices. Operating system 122 may take several forms, such as various known proprietary operating systems or open-source Portable Operating System Interface type operating systems that employ a kernel.

Peripheral device set 114 includes one or more peripheral devices connected to computer system 101. For example, via an input/output (I/O interface). Data communication connections between the peripheral devices and the other components of computer system 101 may be implemented using various methods. For example, through connections using Bluetooth, Near-Field Communication (NFC), wired connections or cables (such as universal serial bus (USB) type cables), insertion type connections (for example, secure digital (SD) card), connections made though local area communication networks and/or wide area networks such as the internet. In various embodiments, UI device set 123 may include components such as a display screen, speaker, microphone, wearable devices (such as goggles, headsets and smart watches), keyboard, mouse, printer, touchpad, game controllers, and haptic devices. Storage 124 can include external storage, such as an external hard drive, or insertable storage, such as an SD card. Storage 124 may be persistent and/or volatile. In some embodiments, storage 124 may take the form of a quantum computing storage device for storing data in the form of qubits. In some embodiments, networks of computing systems 101 may utilize clustered computing and components acting as a single pool of seamless resources when accessed through a network by one or more computing systems 101. For example, a storage area network (SAN) that is shared by multiple, geographically distributed computer systems 101 or network-attached storage (NAS) applications. IoT sensor set 125 can be made up of sensors that can be used in Internet of Things applications. For example, a sensor may be a temperature sensor, motion sensor, infrared sensor or any other type of known sensor type.

Network module 115 may include a collection of computer software, hardware, and firmware that allows computer system 101 to communicate with other computers through a computer network, such as WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 can be performed on physically separate devices, such that the control functions manage several different network hardware devices. Computer readable program instructions for performing the inventive methods can typically be downloaded to computer system 101 from an external computer or external storage device through a network adapter card or network interface included in network module 115.

Figure 2:
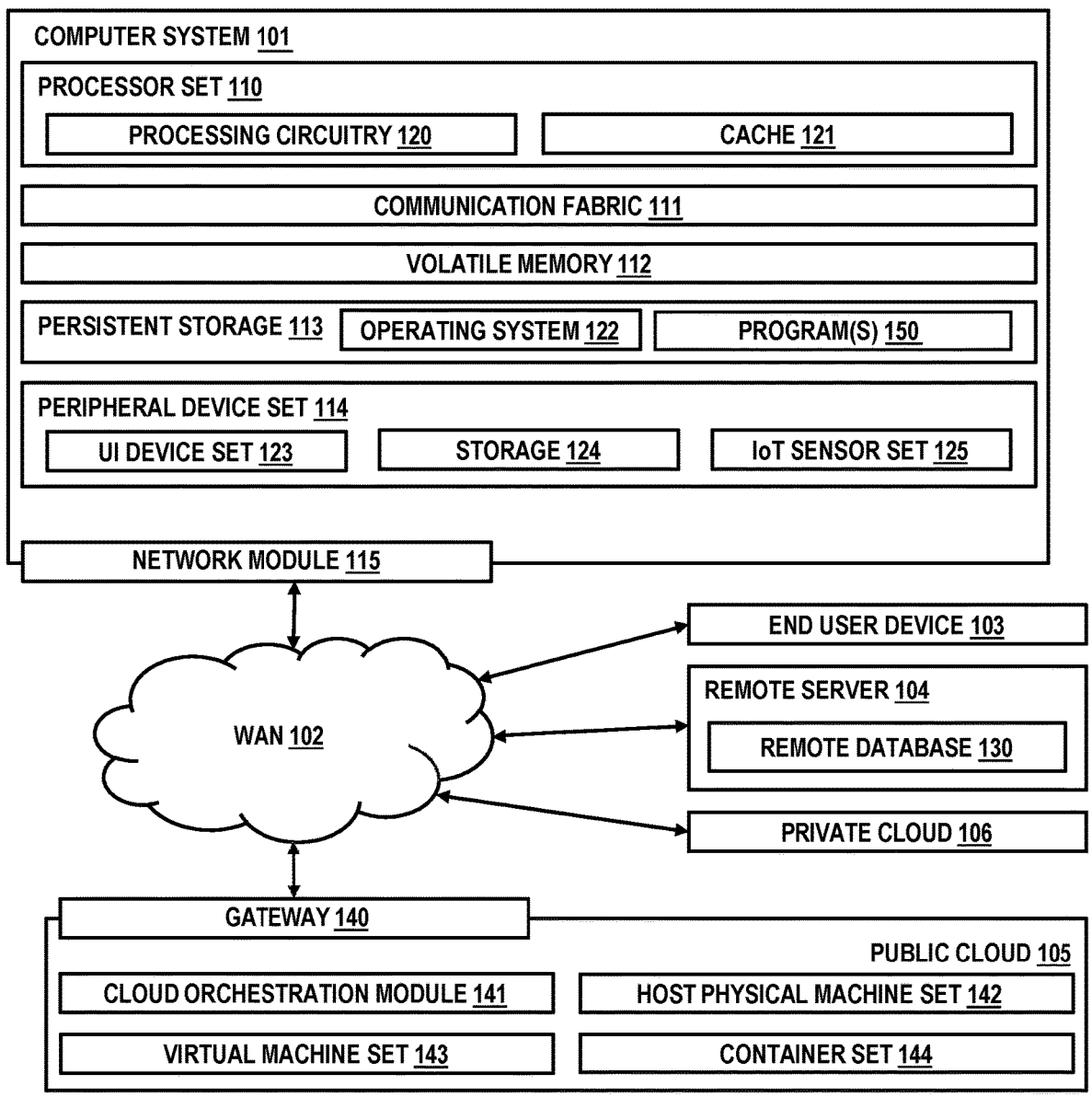
FIG. 2 depicts a block diagram illustrating an extension of the computing system environment of FIG. 1, wherein the computer systems are configured to operate in a network environment and perform methods described herein in accordance with the present disclosure.
Figure 3A:
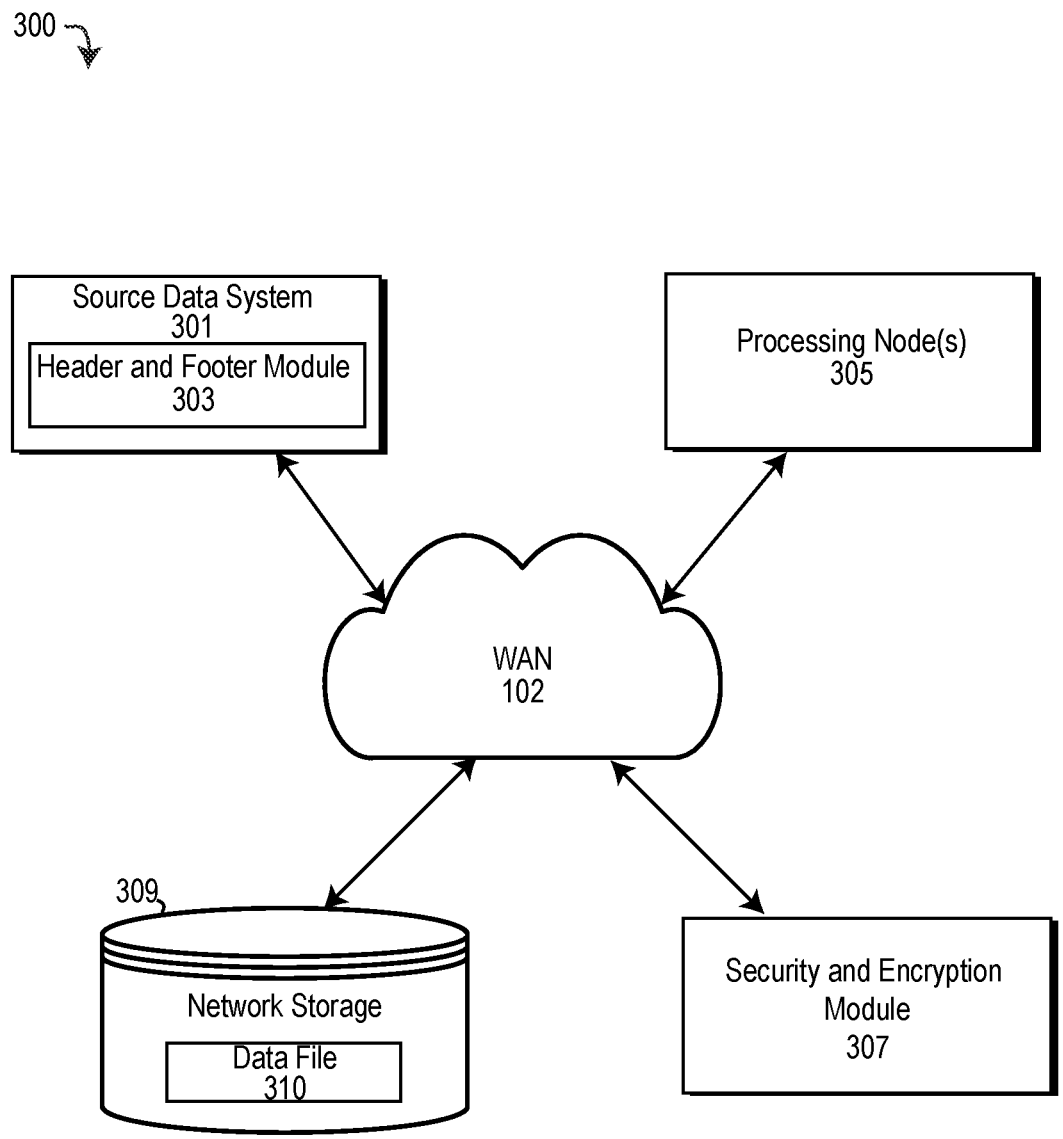
FIG. 3A depicts a functional block diagram describing an embodiment of a computing environment for defining and enforcing data security and/or encryption requirements of a source dataset throughout a data flow trajectory of a network, in accordance with the present disclosure.
Figure 3B:
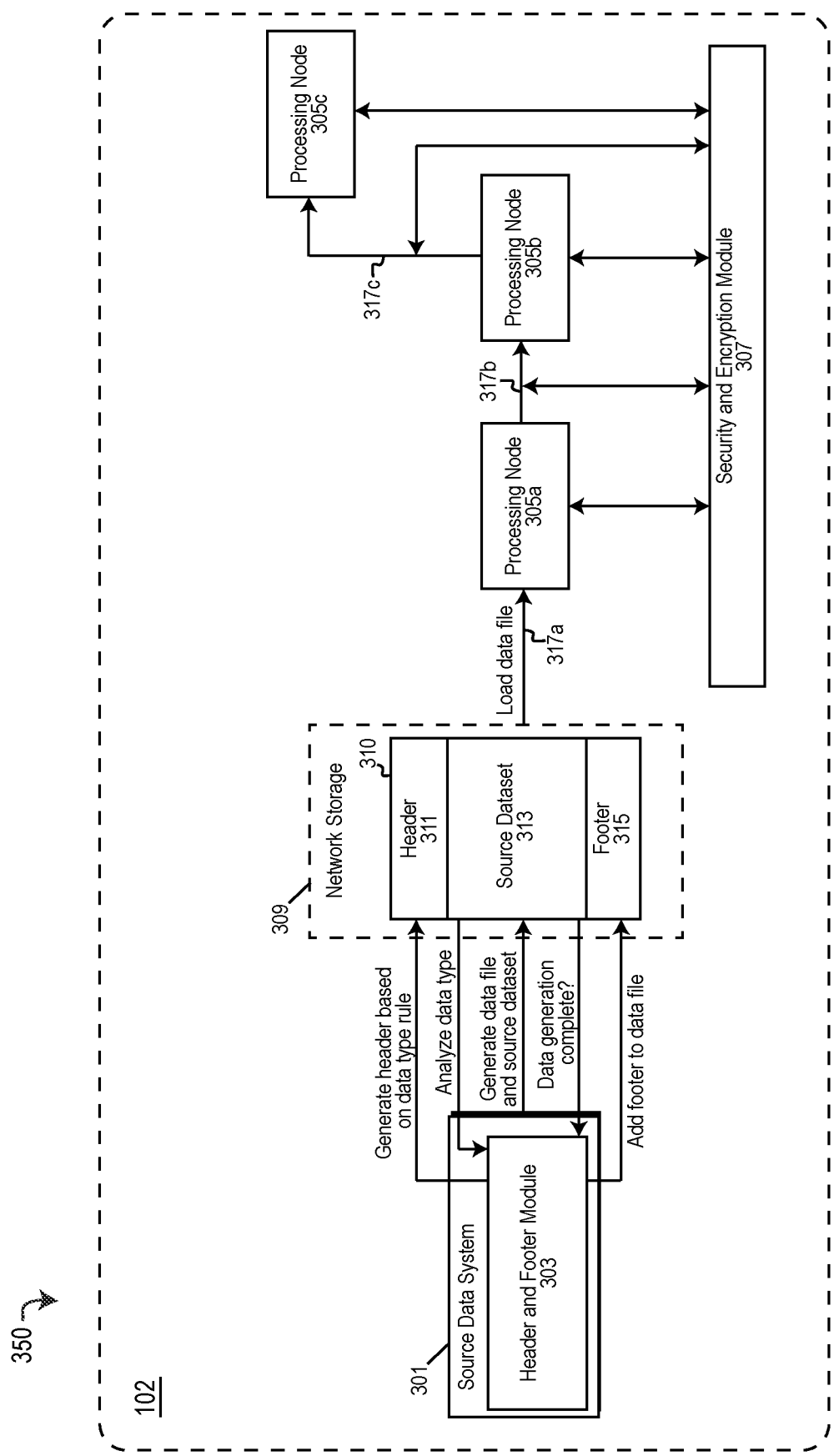
FIG. 3B depicts a functional block diagram describing an embodiment of a workflow defining and enforcing data security and encryption requirements of a source dataset throughout a data flow trajectory of a network, in accordance with the present disclosure.

FIG. 2 depicts a computing environment 200 which may be an extension of the computing environment of FIG. 1, operating in a networked environment. In addition to computing system 101, computing environment 200 can include wide area network (WAN) 102 (or another type of computer network) connecting to an end user device (EUD) 103, remote server 104, public cloud 105, and/or private cloud 106. In this embodiment, computer system 101 includes processor set 110 (including processing circuitry 120 and cache 121), communication fabric 111, volatile memory 112, persistent storage 113 (including operating system 122 and program(s) 150, as identified above), peripheral device set 114 (including user interface (UI), device set 123, storage 124, Internet of Things (IoT) sensor set 125), and network module 115. Remote server 104 includes remote database 130. Public cloud 105 includes gateway 140, cloud orchestration module 141, host physical machine set 142, virtual machine set 143, and/or container set 144.

WAN 102 may be described as any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs may be comprised of wired or wireless connections. For example, connections may be comprised of computer hardware such as copper transmission cables, optical transmission fibers, wireless transmission, routers, firewalls, switches, gateway computers and/or edge servers. Other types of networks that can be used to interconnect the various computer systems 101, end user devices 103, remote servers 104, private cloud 106 and/or public cloud 105 may include Wireless Local Area Networks (WLANs), home area network (HAN), backbone networks (BBN), peer to peer networks (P2P), campus networks, enterprise networks, the Internet, single tenant or multi-tenant cloud computing networks, the Public Switched Telephone Network (PSTN), and any other network or network topology known by a person skilled in the art to interconnect computing systems 101.

End user device 103 can include any computer device that can be used and/or controlled by an end user (for example, a customer of an enterprise that operates computer system 101) and may take any of the forms discussed above in connection with computer system 101. EUD 103 may receive helpful and useful data from the operations of computer system 101. For example, in a hypothetical case where computer system 101 is designed to provide a recommendation to an end user, this recommendation may be communicated from network module 115 of computer system 101 through WAN 102 to EUD 103. In this example, EUD 103 can display, or otherwise present, the recommendation to an end user. In some embodiments, EUD 103 may be a client device, such as thin client, thick client, mobile computing device such as a smart phone, mainframe computer, desktop computer and so on.

Remote server 104 may be any computing systems that serves at least some data and/or functionality to computer system 101. Remote server 104 may be controlled and used by the same entity that operates computer system 101. Remote server 104 represents the machine(s) that collect and store helpful and useful data for use by other computers, such as computer system 101. For example, in a hypothetical case where computer system 101 is designed and programmed to provide a recommendation based on historical data, the historical data may be provided to computer system 101 from remote database 130 of remote server 104.

Public cloud 105 may be any computing systems available for use by multiple entities that provides on-demand availability of computer system resources and/or other computer capabilities including data storage (cloud storage) and computing power, without direct active management by the user. The direct and active management of the computing resources of public cloud 105 can be performed by the computer hardware and/or software of cloud orchestration module 141. The computing resources provided by public cloud 105 can be implemented by virtual computing environments that run on various computers making up the computers of host physical machine set 142, and/or the universe of physical computers in and/or available to public cloud 105. The virtual computing environments (VCEs) may take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

VCEs can be stored as "images." A new active instance of the VCE can be instantiated from the image. Two types of VCEs may include virtual machines and containers. A container is a VCE that uses operating-system-level virtualization, in which the kernel allows the existence of multiple isolated user-space instances, called containers. These isolated user-space instances may behave as physical computers from the point of view of programs 150 running in them. A computer program 150 running on an operating system 122 can utilize all resources of that computer, such as connected devices, files and folders, network shares, CPU power, and quantifiable hardware capabilities. Programs 150 running inside a container of container set 144 may only use the contents of the container and devices assigned to the container, a feature which may be referred to as containerization.

Private cloud 106 may be similar to public cloud 105, except that the computing resources may only be available for use by a single enterprise. While private cloud 106 is depicted as being in communication with WAN 102 (such as the Internet), in other embodiments a private cloud 106 may be disconnected from the internet entirely and only accessible through a local/private network. A hybrid cloud may refer to a composition of multiple clouds of different types (for example, private, community or public cloud types), and the plurality of clouds may be implemented or operated by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 may be both part of a larger hybrid cloud environment.

System for Dynamically Defining and Enforcing Data Security and/or Encryption Requirements of a Source Dataset It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the Figures, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

Referring to the drawings, FIG. 3A depicts an embodiment of a computing environment 300 capable of dynamically defining and enforcing data security, encryption and/or other parameters or requirements of a network responsible for transferring and processing datasets generated by one or more source data systems 301. As illustrated, the computing environment 300 may comprise one or more source data system 301, one or more processing node(s) 305, a security and encryption module 307 and/or network storage 309. Source data system 301, processing node(s) 305, network storage 309 and the security and encryption module 307 may be placed in communication with one another via an interconnection of one or more computing networks, such as WAN 102. The network may be formed by a plurality of interconnected nodes and may be described as the interconnection between various communication devices through different communication links. The nodes may be used to exchange, store, send and retrieve data between network devices (i.e., network nodes and/or processing nodes 305). Each node of the network (including processing nodes 305, source data system 301, network storage 309 and/or security and encryption module 307) can act as a connection point for data transmission, process recognition, packet switching, and network distribution. Generally, nodes of the network can be programmed to identify, process, and transmit data from one node to another. The nodes can perform several functions based on the application and network. Embodiments of the node that make up the network can be a computer, printer, switch, or router and the type of nodes making up the network may highly depend on the referred network and protocol layer used to form a network connection. The nodes of the network may be physical nodes and/or virtual nodes. Additionally, each node on the network can includes a unique IP address.

A source data system 301 may be described as a node of the network that may be responsible for generating one or more data file 310 which can include a source dataset 313, as well as an accompanying header 311 and footer 315, inserted within the data file 310. The source dataset(s) 313 generated by a source data system 301 may be selected by applications or various downstream systems of the network for additional processing and fulfill requests made by applications being served by the network of computing environment 300. The data files 310 comprising source a dataset 313 created by the source data system 301 can be copied or stored by network storage 309 connected to the network, such as a network attach storage (NAS) device or cloud storage. Upon applications requesting the source dataset 313, the data file 310 can be transferred and loaded from the network storage 309. Once loaded, additional processing can be performed by processing nodes 305 as the source dataset 313 is transferred along a known data flow trajectory of the network. When source datasets 313 are selected by applications or downstream data systems of the network for processing, the source data system 301 may be the first system in the network to analyze one or more headers 311 within the data file 310, identify the data flow trajectory along the network during processing of the the data file 310 being requested and identify (based on the header(s) 311 within the data file 310) where data security, encryption and other security parameters or features along the data flow trajectory are to be enforced along the network and at one or more processing nodes 305.

Embodiments of the source data system 301 may be installed with a header module, a footer module, and/or a combined header and footer module 303 as shown in FIG. 3A. A header module may analyze source datasets 313, generate an appropriate header for said data type and insert the headers 311 into corresponding data file 310. Likewise, a footer module may generate and insert footers 315 into data files 310. The combined header and footer module 303 can generate and insert both headers 311 and/or footers 315 corresponding to identified data types within the source dataset 313 into a data file 310. The term "module" as discussed herein may refer to a hardware module, software module, or a module may be a combination of hardware and software resources. A module (whether hardware, software or a combination thereof) may be designed to implement or execute one or more specific tasks, routines and/or functions. Embodiments of hardware-based modules may include self-contained components such as chipsets, specialized circuitry, processor sets 110, one or more volatile memory 112 devices and/or persistent storage 113. A software-based module may be part of a program 150, program code or linked to program code comprising a set of specific programmed instructions loaded into a volatile memory 112 or persistent storage 113.

Embodiments of the header and footer module 303 may perform the function, tasks, or processes associated with generating and inserting headers and/or footers into data files 310 comprising a source dataset 313 in accordance with network rules and requirements for processing and/or transmitting different types of data across the network. While performing tasks or functions associated with header 311 generation, the header and footer module 303 may analyze the source dataset 313, identify the type of data found within the source dataset 313, and select a type of header 311 to apply based on the type of data within the source dataset 313. In other embodiments, header and footer module 393 may query or lookup network rules and requirements for transmitting and/or processing the types of date found identified within the source dataset 313 and select the appropriate header 311 that complies with the network rules for handling and processing the specific data type(s). In some situations, a source dataset 313 may comprise a plurality of different data types. Under such circumstances where multiple different types of data are present within a source dataset 313, a hierarchy of headers 311 can be generated prescribing the different levels of data security and encryption requirements at different portions of the source dataset 313, corresponding to the various data types present that processing nodes 305 and/or components of the network may need to comply with during the processing and/or transmission of the source dataset 313 along the dataflow trajectory.

Embodiments of the header 311 (or hierarchy of headers 311) being generated by the header and footer module 303 may be inserted into a data file 310 at a position at the beginning of the data file 310, prior to or above, the source dataset 313. By inserting the header 311 above the source dataset 313, the header 311 may be read first by the processing nodes 305 and the network as the header is passed along the data flow trajectory that will be responsible for processing the source dataset 313. Embodiments of headers 311 generated by the header and footer module 303 of the source data system 301 may prescribe the level and types of data security, confidentiality, encryption and/or other requirements of the network that should be enforced by each of the different processing nodes 305 and/or sections of the network along the data flow trajectory before handling or processing the source dataset 313. Ensure that the source dataset 313 is transferred and processed by the network in a manner consistent with network rules for processing and/or transmitting the type(s) of data found within the source dataset 313.

Embodiments of the header and footer module 303 may also be responsible for performing tasks, processes and functions associated with generating and inserting a footer 315 and/or a hierarchy of footers 315 into a data file 310. Embodiments of footer 315 may be placed at the end of the data file 310, following the source dataset 313. In exemplary embodiments, one or more footer 315 may be inserted into the data file 310 following the completed generation of the source dataset 313 or a portion of the source dataset 313 corresponding to a particular data type. As a function of the location where the footer 315 is positioned, when the data file 310 is read in sequence by the processing nodes 305 and/or other nodes of the network along the data flow trajectory, the footer 315 may be read last. Whereas the header 311 is read first, providing an opportunity for processing nodes 305 and portions of the network along the data flow trajectory to be configured and the prescribed levels of security and/or encryption to be enforced prior to the receipt of the source dataset 313 which may follow behind the header 311 once configuration is complete and being enforced. Each footer 315 inserted into the data file 310 may specify one or more conditions that may be met in order for the level of security, encryption requirements, confidentiality or other security features prescribed by a corresponding header 311 to be removed from one or more processing nodes 305 and/or the other nodes and components of the network. If conditions described by the footer 315 are met, security and encryptions module 307 (described in detail below) may be instructed to remove, revoke or uninstall data security features, encryption, network policies or other measures being enforced at one or more processing nodes 305 and network locations along the data flow trajectory handling the processed data file 310.

Embodiments of computing environment 300 may include one or more processing node(s) 305 of the network. Processing nodes 305 may be a device, connection point, redistribution point or communication endpoint of the network responsible for conducting processing operations on the source dataset 313 as requested data file 310 proceeds through the known data flow trajectory of the network. Processing nodes 305 can be programmed with capabilities that allow the processing node 305 to recognize, process, and/or forward transmissions to other nodes of the network. As part of the data processing functions, processing nodes 305 may manipulate the data of the source dataset 313 using a computing system, convert raw data of a source dataset 313 into a machine-readable format and/or translate the source dataset 313 into usable information (such as a graph, document, video, images, plain text, etc.), which may give the source dataset 313 a form and/or context that can be interpreted by end user devices and applications requesting the source dataset 313. During the processing stage, processor nodes 305 may perform processing of the source dataset 313 using one or more machine learning algorithms, which may vary depending on the source of the data being processed. The data comprising the source dataset 313 may flow through one or more CPUs, processors and/or memory of the processing nodes 305 positioned along the data flow trajectory of the network. Once data has been processed by the processing nodes 305, recipients of the processed data, such as applications and/or end user devices, may be able to self-serve the processed data for their own data analytics and intended uses.

Computing environment 300 can include a security and encryption module 307. Embodiments of the security and encryption module 307 may configure processing nodes 305 and the network connections positioned along a data flow trajectory in accordance the level of security, encryption, network policies and/or other parameter requirements defined by header 311. Implementation of the configurations enforced by security and encryption module 307 may be put into place to enforce a level of data security, encryption, confidentiality or other security parameters consistent with the level of security prescribed by the headers 311 prior to receiving the source dataset 313 at the particular nodes of the data flow trajectory, During configuration of the processing nodes 305 and the connections along a network, the security and encryption module 307 may install software and/or components thereof as well as enable network policies for enforcing the data security, encryption settings, confidentiality settings, or other parameters prescribed by the header 311.

Embodiments of security and encryption module 307 may also perform tasks, functions and processes associated with the removal of the data security, encryption, confidentiality settings from processing nodes 305 and/or other nodes of the network, in compliance with meeting the conditions for the removal thereof prescribed by footer 315. Once the processing of the actual source dataset 313 is completed at one or more nodes of the network, the footer 315 may flow through the data flow trajectory and be read by each of the nodes of the network and/or the security and encryption module 307. Based on the notes provided by footer 315, if the conditions are met for removing and/or downgrading the levels of security, encryption, confidentiality or other parameters set by header 311, security and encryption module 307 may uninstall, revoke and/or remove installed software, components, network policies, etc. that were enforcing the level of data security, encryption, etc. previously prescribed by the header 311.

In some embodiments where multiple source datasets 313 are being processed and there may be at least a partial overlap between the nodes along the data flow trajectories being used to process the source datasets 313 and/or the source datasets share at least some of the same level of data security and encryption requirements for processing, embodiments of the security and encryption module 307 may not fully uninstall or remove installed software components, network policies, etc. that are in common between the first and second source datasets. Instead, security and encryption module 307 may only partially uninstall, revoke and/or remove software, components and policies required for processing the first source dataset that are not applicable to the second source dataset. Minimizing the amount of installation and removal that may occur as multiple datasets having at least some of the same requirements are processed by at least some of the same processing nodes 305 and/or transmitted along the same sections of the network. For example, security and encryption module 307 may identify one or more commonalities between the requirements among the headers 311 and footers 315 for the different source datasets 313 being processed. Instead of uninstalling software, components and policies that were previously installed for processing a first dataset, security and encryption module 307 may maintain the software, components, policies, etc. that may be in common with the requirements for enforcing the second source dataset that is being processed by at least some or all of the nodes that processed the first source dataset, at a particular level of data security and encryption. Any remaining software, components, policies, etc., that are not applicable for maintaining the level of data security, encryption and/or confidentiality in accordance with the header 311 associated with the second dataset can be removed by the security and encryption module 307.

Referring to the drawing of FIG. 3B, an embodiment of a computing environment 350 is depicted describing an example of workflow for dynamically enforcing and removing a level of data security, encryption, confidentiality or other parameters defined by a header 311 and footer 315 for processing a source dataset 313 generated by a source data system 301 of a network. As shown, the source data system 301, installed with a header and footer module 303, generates a data file 310 comprising a source dataset 313. As the source dataset 313 is being generated, the header and footer module 303 analyzes the type of source data being generated and stored as the source dataset 313. Based on the types of source data being generated, header and footer module 303 may consult one or more rules for the network, detailing the types of security and encryption may be requirement within the network and/or processing nodes 305 for handling and processing the type of data within the source dataset 313. In response to identifying the appropriate rule requirements for the type of data being generated within source dataset 313, header and footer module 303 generates a header 311 based on the data type rules and inserts the header at the beginning of data file 310 as shown. If multiple data types of data are identified as being generated by the source data system 301, header and footer module 303 may generate a hierarchy of headers 311 which describe the level of data security, encryption or other parameters that should be enforced to process of the source dataset 313 in a manner consistent with the data type rules of the network.

As shown, in FIG. 3B, the header and footer module 303 may check whether or not the source data system 301 has completed the generation of the source dataset 313. If source data generation is incomplete, the header and footer module 303 may continue to analyze the data types within the source dataset 313 and apply the appropriate headers 311 consistent with the data type rules of the network. Upon completed generation of the source dataset 313, header and footer module 303 may generate one or more footers 315 corresponding to the headers 311 generated for handling each data type within the source dataset 313 and add the footers 315 in order to the end of the data file 310. Each of the footers 315 may specify when a created level of security, encryption or other parameters enforced by the network and/or processing nodes 305 can be removed from the network and the processing nodes 305. Inside corresponding headers 311 and footers 315, the same level of data security and encryption or other parameters may be required. The data file 310 may be placed onto a shared network drive, such as shared network storage 309, making the source dataset 313 available to downstream applications.

When a selected source dataset 313 is selected by a downstream application, the data file 310 is loaded from the network storage 309, and header 311 for the selected source dataset 313 is analyzed. Based on the analysis of the header 311, the entire data flow trajectory 317a-317c (generally data flow trajectory 317) is known to the source data system 301. Header 311 is transmitted along the data flow trajectory 317 including the interconnections of the network and processing nodes 305a-305c in this example. Each portion of the network and the processing nodes 305a-305c along the data flow trajectory 317 read the header 311 for requirements comprising a level of data security and/or encryption required by each section of the network and processing nodes 305a-305c along the data flow trajectory 317. Security and encryption module 307 may install and apply software, components, network policies and other enforcement mechanisms to the network and processing nodes 305a-305c to configure each section of the data flow trajectory 317 ensuring that the source dataset 313 is handled in a manner and level of security required by the header 311.

Once the processing nodes 305a-305c and the interconnections of the network along the data flow trajectory 317 are properly configured to enforce the requirements established by header 311, the source dataset 313 is allowed to move through the network along the data flow trajectory 317 to each of the processing nodes 305a-305c and the processing of the source dataset 313 can commence. Once the processing of the source dataset 313 completes, the footer 315 of the data file 310 is read by the processing nodes 305a-305c and the nodes of the network along the data flow trajectory 317. In view of reading the footer 315, security and encryption module 307 confirms that the required level of security and encryption can be removed or revoked along the network and processing nodes 305a-305c positioned along the data flow trajectory 317, including the removal and/or uninstallation of any software, components and network policies that may have been enabled or installed to enforce the level of security and encryption in a manner consistent with header 311, but are no longer needed following completion of the processing of source dataset 313.

Figure 4A:
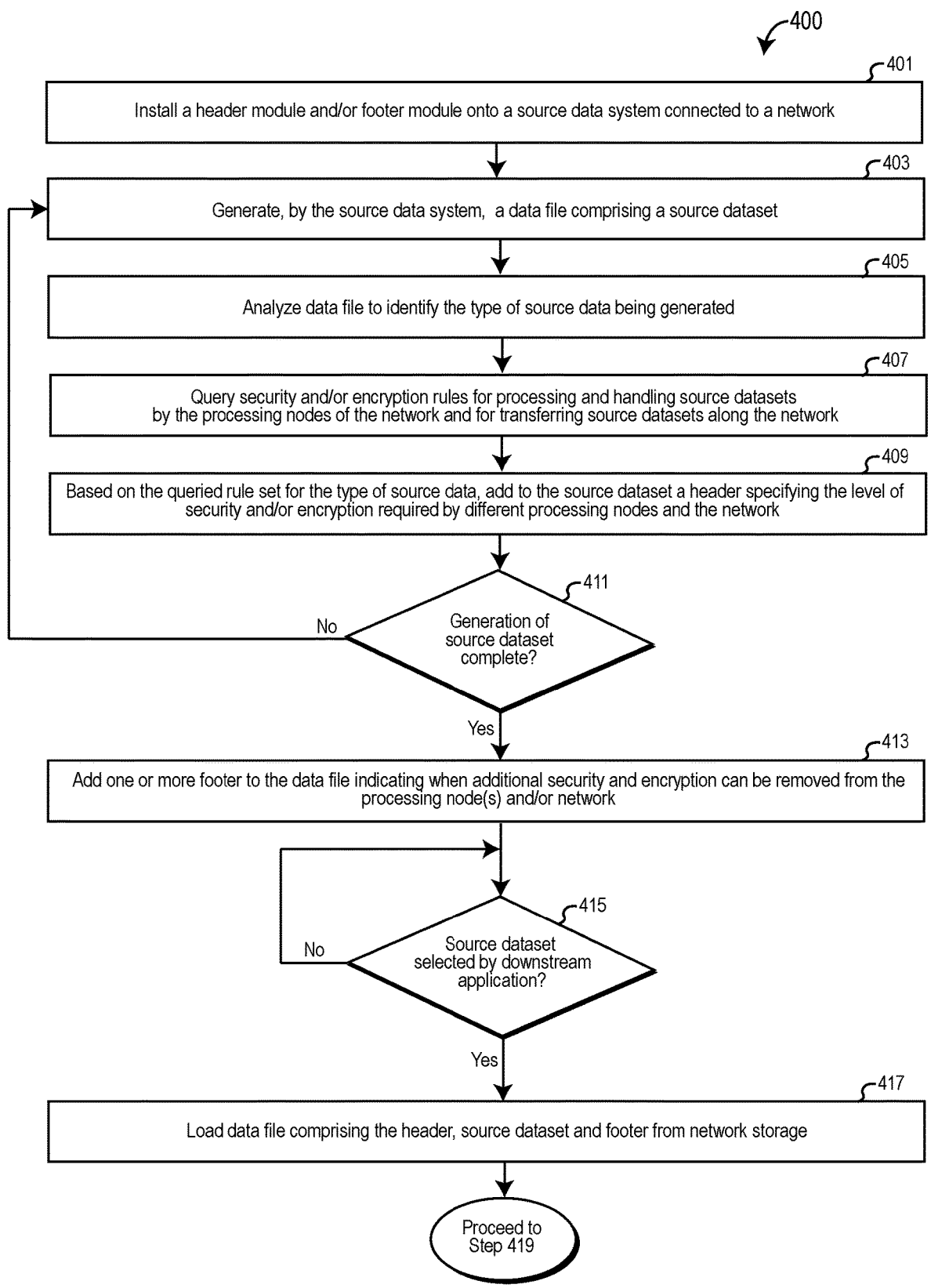
FIG. 4A depicts a flow diagram describing an embodiment of a computer-implemented method for defining and enforcing data security and encryption requirements of a source dataset throughout a data flow trajectory using one or more types of headers and/or footers within the data file comprising the source dataset, in accordance with the present disclosure.
Figure 4B:
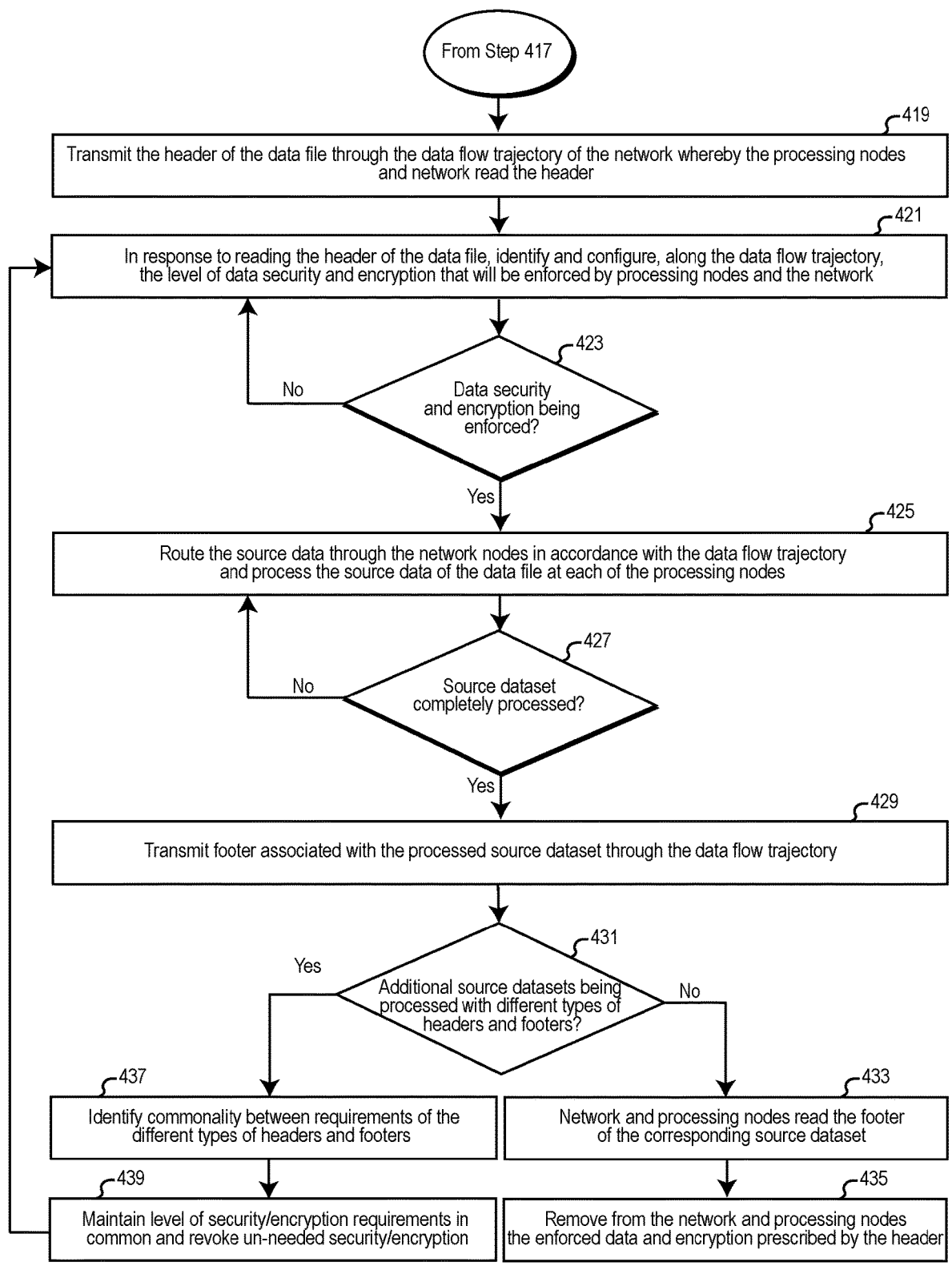
FIG. 4B depicts a continuation of the flow diagram of FIG. 4A describing the computer-implemented method for defining and enforcing the data security and encryption requirements of the source dataset throughout the data flow trajectory using one or more types of headers and/or footers within the data file comprising the source dataset.

Method for Dynamically Defining and Enforcing Data Security and/or Encryption Requirements of a Source Dataset The drawings of FIGS. 4A-4B represent and embodiment of a method 400 for dynamically defining and enforcing data security and encryption requirements of a source dataset 313 throughout a data flow trajectory 317 of a network, in accordance with the computing systems and examples depicted in FIGS. 1-3B and as described herein. A person skilled in the art should recognize that the steps of the method 400 described in FIGS. 4A-4B may be performed in a different order than presented and may not require all the steps described herein to be performed.

The embodiment of method 400 described by FIGS. 4A-4B may begin at step 401. During step 401, a header and footer module 303 may be installed onto a source data system 301 connected to a network. In step 403, the source data system 301 may generate a data file 310 comprising a source dataset 313. In step 405 the source data system 301 may analyze the data file 310 being created for a type of source data being generated. In step 407 of method 400, the source data system 301 may query security and/or encryption rules of the network for processing source datasets 313 of the type of source data identified in step 405, in a manner consistent with the rules of the network for maintaining data security and/or encryption of the source dataset 313 as its processed by one or more processing nodes 305 and/or transferred between processing nodes 305 by one or more nodes of the network.

In step 409, based on the queried rules set for the type of source data of the data file 310, the header and footer module 303 of the source data system 301 may add or insert a header 311 into the data file 310. The inserted header 311 being added to the source data file 310 may specify a level of data security and/or encryption required by the network and/or enforced by the processing nodes 305 along a data flow trajectory 317 of the network. In step 411, of the method 400, the source data system 301 may determine whether or not the source dataset 313 being generated by the source data system 301 has finished completely generating the source dataset 313. If the source dataset 313 has not finished being generated, the method 400 may return to step 403, wherein the source data system 301 may continue to generate the source dataset 313 of the data file 310 and insert headers 311 as appropriate into the data file 310 or build a hierarchy of headers 311. Conversely, if in step 411 the generation of the source dataset 313 is complete, the method 400 may proceed to step 413.

During step 413 of method 400, the source data system 301 may add one or more footer 315 to the data file 310 following the source dataset 313. The footer 315 inserted into the data file 310 may indicate when additional levels of data security and/or encryption prescribed by the header 311 of the data file 310 can be removed from processing nodes 305 and/or the network along the data flow trajectory 317. The completed data file 310 comprising the header 311, source dataset 313 and footer 315 may be stored by the source data system 301 and/or stored on network storage 309 which may be accessible to one or more downstream computing systems or applications of the network. In step 415, a determination is made whether or not the source dataset 313 has been selected by one or more downstream computing systems or applications for processing. If the source dataset 313 has not been selected by a downstream system or application, the method may loop back to step 415, and check whether or not the source dataset 313 is selected. Upon the source data set being selected by a downstream system or application of the network, the method 400 may proceed to step 417.

During step 417, the data file 310 comprising the header 311, source dataset 313 and footer 315 may be loaded from the network storage 309 or the source data system 301. In step 419, the header 311 of the selected data file 310 may be transmitted through the data flow trajectory 317 of the network, including each of the processing nodes 305 and/or networking nodes expected to process and transfer the source dataset 313 across the network. Each processing node 305 and networking node may read the header 311 of the data file 310. During step 421, in response to reading the header 311 of the data file 310, each of the processing nodes 305 and networking nodes along the data flow trajectory 317 of the network may identify and configure a level of data security and encryption that will be enforced by the processing nodes 305 and network nodes during the processing and transmission of the source dataset 313 by the network. The security and encryption module 307 may configure the nodes of the network for compliance with the levels of data security and/or encryption and may install one or more components onto each of the nodes for enforcing the data security and encryption settings prescribed by the header 311.

In step 423 of method 400, a determination may be made whether or not the level of data security and encryption prescribed by the header 311 of the data file 310 is being enforced. The security and encryption module 307 may confirm and report the level of data security and encryption being enforced at each of the nodes of the network along the data flow trajectory 317. If the data and security being enforced by the nodes of the network does not match the prescribed level of data security and encryption prescribed by the header 311 of the data file 310, the method 400 may return to step 421, wherein the security and encryption module 307 of the network may continue configuring the nodes of the network and/or installing software and/or components necessary to comply with the level of data security prescribed by the header 311 of the data file 310. Likewise, upon the security and encryption module 307 confirming the nodes of the network along the data flow trajectory 317 are in compliance with the level of data security and encryption prescribed by the header 311, the method may proceed to step 425.

During step 425 of method 400, the network routes the source dataset 313 selected for processing through the nodes of the network in accordance with the data flow trajectory 317. The source dataset 313 is processed by each of the processing nodes 305 at the level of data security and encryption being enforced by the security and encryption module 307. In step 427, a determination is made whether or not the source dataset 313 has been completely processed by the processing nodes 305 of the network along the data flow trajectory 317. If the source dataset 313 has not completed processing, the method 400 may return to step 425, whereby the source dataset 313 is continued to be routed along the network and processed by the processing nodes 305 at the level of data security and encryption prescribed by the header 311 of the data file 310. Conversely, upon completion of processing the source dataset 313, the method 400 may proceed to step 429. During step 429, the footer 315 of the data file 310 comprising the processed source dataset 313 may be transmitted through the network along the data flow trajectory 317 to each of the processing nodes 305 and networking nodes of the network.

In step 431, a determination is made whether additional source datasets 313 are being processed by the network that may have different types of headers 311 and footers 315 associated therewith. If the additional source datasets 313 are not being processed that have the different type of headers 311 and footers 315, the method 400 may proceed to step 433. During step 433, the network nodes and processing nodes 305 along the data flow trajectory 317 may read the footers 315 transmitted during step 429. In step 435, the security and encryption module 307 enforcing the level of data security and encryption on each of the processing nodes 305 and networking nodes receiving the footer 315, may remove the security and encryption requirements previously prescribed by the header 311, including the removal and/or revocation or software and installed components required to implement the data security and/or encryption of the source dataset 313 that has been processed by the nodes of the network. Conversely, if in step 431 additional source datasets 313 are being processed by the network and the additional source datasets 313 being processed include different types of headers 311 and footers 315, the method 400 may proceed to step 437.

During step 437, the security and encryption module 307 may identify whether one or more commonalities exist between the data security and encryption requirements of the different types of headers 311 and footers 315 being applied to the additional source dataset. For each of the security and encryption requirements that are in common for the additional datasets and the source dataset 313 that has been completely processed, in step 439 the security and encryption module 307 may maintain the level of data security and encryption requirements, while revoking and/or removing data security and encryption software, components and/or requirements that are unnecessary or no longer needed in view of the completed processing of the source dataset 313.

What is claimed is:

1. A computer-implemented method for dynamically defining and enforcing data security and encryption requirements of a source dataset throughout a data flow trajectory of a network, the computer-implemented method comprising:

selecting, by a processor of the network, a data file generated by a source data system of the network, the data file comprising a header, a type of data within the source dataset, and a footer associated with the defined data security and encryption requirements, wherein the header specifies a level of security or encryption for processing nodes and the network along the data flow trajectory of the network responsible for processing the source dataset, and the footer specifies at least one condition for removing the level of security or encryption prescribed by the header from the network and processing nodes;

transmitting, by the processor, the header of the source dataset through the data flow trajectory of the network to be read by the processing nodes and the network;

configuring, by the processor, each of the processing nodes and the network along the data flow trajectory with enforcement of data security and encryption at the level of security or encryption specified by the header, consistent with network rules for processing the type of data within the source dataset;

routing, by the processor, the source dataset through the processing nodes along the data flow trajectory of the network for processing;

upon completion of the processing of the source dataset, transmitting, by the processor, the footer with the specified at least one removal condition to the processing nodes and the network along the data flow trajectory; and removing, by the processor, the level of security or encryption being from the enforced by the processing nodes and the network, that matches the at least one removal condition as specified by the footer.

2. The computer-implemented method of claim 1, further comprising:

generating, by the processor, the data file and the source dataset of the data file;

identifying, by the processor, the type of data within the source dataset;

querying, by the processor, security and encryption rules of the network for processing and transmitting the type of data identified on the network; and inserting, by the processor, the header specifying the level of security or encryption for the network and processing nodes processing and transmitting the source dataset throughout the data flow trajectory, consistent with the security and encryption rules of the network.

3. The computer-implemented method of claim 2, further comprising:
upon completion of generating the source dataset of the datafile, inserting, by the processor, the footer into the data file following the source dataset, wherein inside the header and the footer of the datafile, the header and footer have a same level of data security and encryption.

4. The computer-implemented method of claim 1, wherein the source dataset includes multiple levels of data security and encryption requirements, the levels of data security and encryption specified by the header and removal of the levels of data security and encryption by the footer, are added to the header and the footer in a hierarchy.

5. The computer-implemented method of claim 1, wherein a plurality of source datasets are processed by the network, the computer-implemented method further comprises:
identifying, by the processor, a commonality between the levels of data security and encryption requirements of different types of headers and footers associated with the plurality of source datasets being processed;
maintaining, by the processor, the levels of data security and encryption requirements in common amongst the different types of headers and footers associated with the plurality of the source datasets being processed; and
upon completing processing of at least one of the plurality of source datasets, removing, by the processor, the levels of data security and encryption requirements not found in the headers and footers of incompletely processed sourced datasets from the network and the processing nodes.

6. The computer-implemented method of claim 1, further comprises:
reading, by the processor, the data file selected by the network for processing sequentially, beginning with the header, followed by the source dataset then the footer.

7. The computer-implemented method of claim 1, wherein the data file generated by a source data system, is selected from a network storage device of the network.

8. A computer system for dynamically defining and enforcing data security and encryption requirements of a source dataset throughout a data flow trajectory of a network comprising:
a processor device; and a
computer-readable storage media coupled to the processor, wherein the computer-readable storage media contains program instructions executing, via the processor, a computer-implemented method comprising:
selecting, by the processor device of the network, a data file generated by a source data system of the network, the data file comprising a header, a type of data within the source dataset, and a footer associated with the defined data security and encryption requirements, wherein the header specifies a level of security or encryption for processing nodes and the network along the data flow trajectory of the network responsible for processing the source dataset, and the footer specifies at least one condition for removing the level of security or encryption prescribed by the header from the network and processing nodes;

transmitting, by the processor device, the header of the source dataset through the data flow trajectory of the network to be read by the processing nodes and the network;
configuring, by the processor, each of the processing nodes and the network along the data flow trajectory with enforcement of data security and encryption at the level of security or encryption specified by the header, consistent with network rules for processing the type of data within the source dataset;
routing, by the processor device, the source dataset through the processing nodes along the data flow trajectory of the network for processing;
upon completion of the processing device of the source dataset, transmitting, by the processor, the footer with the specified at least one removal condition to the processing nodes and the network along the data flow trajectory; and
removing, by the processor, the level of security or encryption being from the enforced by the processing nodes and the network, that matches the at least one removal condition as specified by the footer.

9. The computer system of claim 8, further comprising:
generating, by the processor, the data file and the source dataset of the data file;
identifying, by the processor, the type of data within the source dataset;
querying, by the processor, security and encryption rules of the network for processing and transmitting the type of data identified on the network; and
inserting, by the processor, the header specifying the level of security or encryption for the network and processing nodes processing and transmitting the source dataset throughout the data flow trajectory, consistent with the security and encryption rules of the network.

10. The computer system of claim 9, further comprising:
upon completion of generating the source dataset of the datafile, inserting, by the processor, the footer into the data file following the source dataset, wherein inside the header and the footer of the datafile, the header and footer have a same level of data security and encryption.

11. The computer system of claim 8, wherein the source dataset includes multiple levels of data security and encryption requirements, the levels of data security and encryption specified by the header and removal of the levels of data security and encryption by the footer, are added to the header and the footer in a hierarchy.

12. The computer system of claim 8, wherein a plurality of source datasets are processed by the network, the computer-implemented method further comprises:
identifying, by the processor, a commonality between the levels of data security and encryption requirements of different types of headers and footers associated with the plurality of source datasets being processed;
maintaining, by the processor, the levels of data security and encryption requirements in common amongst the different types of headers and footers associated with the plurality of the source datasets being processed; and
upon completing processing of at least one of the plurality of source datasets, removing, by the processor, the levels of data security and encryption requirements not found in the headers and footers of incompletely processed sourced datasets from the network and the processing nodes.

13. The computer system of claim 8, further comprises:
reading, by the processor, the data file selected by the network for processing sequentially, beginning with the header, followed by the source dataset then the footer.

14. The computer system of claim 8, wherein the data file generated by a source data system, is selected from a network storage device of the network.

15. A computer program product embodied in one or more non-transitory computer readable storage media having computer readable program instructions stored thereon for dynamically defining and enforcing data security and encryption requirements of a source dataset throughout a data flow trajectory of a network comprising, when executed by a processor device, performing the steps of:
selecting, by a processor of the network, a data file generated by a source data system of the network, the data file comprising a header, a type of data within the source dataset, and a footer associated with the defined data security and encryption requirements, wherein the header specifies a level of security or encryption for processing nodes and the network along the data flow trajectory of the network responsible for processing the source dataset, and the footer specifies at least one condition for removing the level of security or encryption prescribed by the header from the network and processing nodes;
transmitting, by the processor, the header of the source dataset through the data flow trajectory of the network to be read by the processing nodes and the network;
configuring, by the processor, each of the processing nodes and the network along the data flow trajectory with enforcement of data security and encryption at the level of security or encryption specified by the header, consistent with network rules for processing the type of data within the source dataset;
routing, by the processor, the source dataset through the processing nodes along the data flow trajectory of the network for processing;
upon completion of the processing of the source dataset, transmitting, by the processor, the footer with the specified at least one removal condition to the processing nodes and the network along the data flow trajectory; and
removing, by the processor, the level of security or encryption being from the enforced by the processing nodes and the network, that matches the at least one removal condition as specified by the footer.

16. The computer program product of claim 15, further comprising:
generating, by the processor, the data file and the source dataset of the data file;
identifying, by the processor, the type of data within the source dataset;
querying, by the processor, security and encryption rules of the network for processing and transmitting the type of data identified on the network; and
inserting, by the processor, the header specifying the level of security or encryption for the network and processing nodes processing and transmitting the source dataset throughout the data flow trajectory, consistent with the security and encryption rules of the network.

17. The computer program product of claim 16, further comprising:
upon completion of generating the source dataset of the datafile, inserting, by the processor, the footer into the data file following the source dataset, wherein inside the header and the footer of the datafile, the header and footer have a same level of data security and encryption.

18. The computer program product of claim 15, wherein the source dataset includes multiple levels of data security and encryption requirements, the levels of data security and encryption specified by the header and removal of the levels of data security and encryption by the footer, are added to the header and the footer in a hierarchy.

19. The computer program product of claim 15, wherein a plurality of source datasets are processed by the network, the computer-implemented method further comprises:
identifying, by the processor, a commonality between the levels of data security and encryption requirements of different types of headers and footers associated with the plurality of source datasets being processed;
maintaining, by the processor, the levels of data security and encryption requirements in common amongst the different types of headers and footers associated with the plurality of the source datasets being processed; and
upon completing processing of at least one of the plurality of source datasets, removing, by the processor, the levels of data security and encryption requirements not found in the headers and footers of incompletely processed sourced datasets from the network and the processing nodes.

20. The computer program product of claim 15, further comprises:
reading, by the processor, the data file selected by the network for processing sequentially, beginning with the header, followed by the source dataset then the footer.

\* \* \* \* \*